(12) United States Patent
Bakalov et al.

(10) Patent No.: US 8,701,025 B2
(45) Date of Patent: Apr. 15, 2014

(54) INTERACTIVE RING-SHAPED INTERFACE

(75) Inventors: Fedor Bakalov, Jena (DE); Birgitta Koenig-Ries, Jena (DE); Andreas Nauerz, Boeblingen (DE); Martin Welsch, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 13/106,294

(22) Filed: May 12, 2011

(65) Prior Publication Data
US 2011/0307813 A1 Dec. 15, 2011

(30) Foreign Application Priority Data

Jun. 11, 2010 (EP) .................................... 10165610

(51) Int. Cl.
*G06F 3/048* (2013.01)
(52) U.S. Cl.
USPC ............ 715/763; 705/14.49; 345/440; 704/9; 715/767; 715/753
(58) Field of Classification Search
USPC ................................................. 715/763, 834
See application file for complete search history.

(56) References Cited

U.S. PATENT DOCUMENTS

| | | | |
|---|---|---|---|
| 6,539,375 B2 | 3/2003 | Kawasaki | |
| 2003/0218611 A1* | 11/2003 | Ben-Tovim et al. | 345/440 |
| 2004/0070624 A1* | 4/2004 | Fushimi et al. | 345/771 |
| 2005/0093866 A1* | 5/2005 | Ebert | 345/440 |
| 2009/0070101 A1* | 3/2009 | Masuyama et al. | 704/9 |
| 2009/0187551 A1* | 7/2009 | Lam et al. | 707/5 |
| 2009/0287989 A1 | 11/2009 | Chakra et al. | |
| 2010/0121707 A1* | 5/2010 | Goeldi | 705/14.49 |
| 2010/0205541 A1* | 8/2010 | Rapaport et al. | 715/753 |
| 2011/0173553 A1* | 7/2011 | Karmon et al. | 715/767 |

OTHER PUBLICATIONS

Keim et al. "Monitoring Network Traffic with Radial Traffic Analyzer", IEEE Oct. 31-Nov. 2, 2006.*
Draper,G & Riesenfeld,R "Interactive Fan Charts: A Space-saving Technique for Genealogical Graph Exploration", 2008,Brigham Young University.*
"Visone: Analysis and Visualization of Social Networks" Mathematics and Visualization 2004,pp. 321-340.*

* cited by examiner

*Primary Examiner* — Tuyetlien Tran
*Assistant Examiner* — Jaime Duckworth
(74) *Attorney, Agent, or Firm* — Hamilton, Brook, Smith & Reynolds, P.C.

(57) ABSTRACT

A computer method and system for interactive visualization and modification of a user interest model via an interactive graphical user interface is described. The method and system comprise displaying at least one keyword in a circular sector on a ring on the interactive graphical user interface, wherein the keyword represents an interest of the user interest model, wherein a radial position of the keyword on the ring represents a degree of interest stored as part of the user interest model, and wherein the circular sector represents a semantic type of the user interest model. The method and system further enable a user to actively influence the modeling server and graphically modify/change the degree of interest via an interaction component of the interactive graphical user interface.

19 Claims, 6 Drawing Sheets

INTERACTIVE RING-SHAPED INTERFACE

CROSS REFERENCE TO RELATED APPLICATION(S)

This application claims priority under 35 U.S.C. §119 or 365 to European, Application No. 10165610.6, filed Jun. 11, 2010.

The entire teachings of the above application(s) are incorporated herein by reference.

FIELD OF THE INVENTION

The invention relates generally to a method for interactive visualization of a user interest model via an interactive graphical user interface, as well as to a graphical interaction system.

The invention relates further to a computer system, a data processing program, and a computer program product.

BACKGROUND OF THE INVENTION

Web portals pioneered as one of the earliest adopters of adaptation and personalization techniques to help users deal with the problem of information overload. Nowadays, a large number of organizations use them as a single-point of access to the vast amount of resources available on the Web and in enterprise intranets. Some organizations strive to make portals adaptive to users and to the context they work in, so that the users will be provided with the right information at the right time. There are different kinds of adaptation effects that users may encounter in an adaptive portal, e.g. the portal's front page displaying recently added resources containing information that the user is interested in, modifying navigation topology to promote interesting pages to better positions, augmenting portal content with additional information that matches the user's current interests, and so on. In order to achieve such adaptation effects, the following criteria may be met.

Firstly, the portal may have a user model containing information about various user features, such as interests, expertise, and traits as well as information about the various contexts that users work in and the rules governing what features have which importance in which context.

Secondly, portal resources may be semantically described so that the adaptation component may automatically select the resources that match user information needs in a given context.

Thirdly, the portal may have a domain knowledge model providing machine readable semantics of the information that is used for describing user features and portal resources.

E.g., patent application US 2009/0287989A1 describes a content manager configured to present a website and a user profile repository including user profile information indicating user interests and preferences. Another patent application, U.S. Pat. No. 6,539,375B2, describes a method for profiling a user of the Internet according to predefined categories of interest. The document discloses scanning content information of an Internet user to generate unknown data and processing unknown data to determine its relevance to predefined categories of interest.

In most adaptive portals, users may only see a final adaptation effect, e.g., a list of recommended items or a modified navigation topology. The mechanism of the adaptation process itself as well as the user model and the domain knowledge model are hidden from users. This harms the overall usability of the system and its acceptance by the users. As a consequence, negative user experiences with the respective portal may become reality. Some of the reasons are listed here:

Firstly, users do not understand how the adaptation works, e.g., why they get recommendations to certain resources.

Secondly, users have a very limited control over the adaptation, which may lead to errors and misunderstandings. For instance, if a user cannot view and modify his own user model, she or he cannot notice and correct wrong assumptions the system makes about her or his interests. This may result in receiving recommendations to irrelevant information.

Thus, there may be a need for an improved architecture for a method for an interactive visualization of a user interest model via an interactive graphical user interface such that the way a user may influence the information in the user interest model is modifiable.

SUMMARY OF THE INVENTION

This need may be addressed by a method for interactive visualization of a user interest model via an interactive graphical user interface, a graphical interaction system, a computer system, a data processing program, and a computer program product according to the independent claims.

According to one embodiment, the method for interactive visualization of a user interest model via an interactive graphical user interface may comprise (a) displaying at least one keyword in a circular sector on a ring on the interactive graphical user interface, wherein the keyword represents an interest of the user interest model, wherein a radial position of the keyword on the ring represents a degree of interest stored as part of the user interest model, and wherein the circular sector represents a semantic type of the user interest model, and (b) changing the degree of interest via an interaction component of the interactive graphical user interface.

According to a further embodiment, a graphical interaction system is provided. The graphical interaction system may comprise a displaying unit adapted for displaying a keyword in a circular sector on a ring on a display of the graphical interaction system, wherein the keyword represents an interest of an user interest model, wherein a radial position of the keyword on the ring represents a degree of interest in the user interest model, and wherein the circular sector represents a semantic type of the user interest model, and a changing unit adapted for changing the degree of interest via an interaction component of the interactive graphical interaction system.

In particular, the ring may be a ring with a very small or zero sized inner ring diameter. Thus, the ring may in fact be a circle. On the other side, several concentric rings may be provided, e.g., three concentric rings representing three degrees of interest in a subject-matter represented by a keyword. These three degrees of interest may be "interest, partial interest", and "no interest". More rings and thus, a higher differentiation in interest levels may be possible.

Moreover, the rings may be colored. E.g., in case of three rings, the inner circle/ring may be red, the outer ring may be blue, and the middle ring may have a color in-between blue and red. Additionally, the color of the rings displayed in the interactive graphical user interface may be shaded or colored in a gradient, denoting the fuzziness between user groups. The colors scheme may be exchangeable. However, the proposed colors above represent a hot/cold model for interest, wherein a red color represents "interest" and a blue color represents "no interest".

In particular, the radial position representing a degree of interest in an information topic represented by a keyword is simply the distance from the center of the circle or ring. This way, the degree of interest may also vary within a ring and, thus, may be primary dependent on the distance of the displayed keyword from the center of the ring.

The circular sectors may in particular fill a complete 360 degree area on the screen. The number of sectors may depend on the content of the user interest model.

The method for interactive visualization of a user interest model via an interactive graphical user interface may in particular enable a zooming function, a panning function, as well as filtering, grouping and changing functions. And the method may be implemented as part of a web-based application.

In particular, the user may be enabled to zoom in/out the entire surface. By zooming in, the user may easily get detailed view on keywords in a certain area and by zooming out, she or he may switch back to the overview of the entire user model. Additionally, users may navigate through a collection of keywords by dragging the surface in a respective direction.

In the context of this application the following expression conventions have been followed:

A user interest model—The user interest model is a data model reflecting interests and related information of a user. Sometimes it may also be referred to as user modeling server. A way to generate a user interest model has several steps: Firstly, collecting a user browsing history. The user browsing history is a major source for identifying user interests. Secondly, named entities need to be extracted. From the content of every resource recorded in the browsing log, the user modeling server extracts named entities leveraging external tools for natural language processing (NLP). Among others, the server extracts entities of such types as person, country, company, technology, product, etc. For example, from the string "Bill Gates lives in California and is working for Microsoft" the server will extract "Bill Gates" as person, "California" as state, and "Microsoft" as company. The extracted entities, called keywords, are recorded in the term log or keyword log. The log contains information about the occurrences of keywords in the portal pages that the user accesses, i.e., which keywords and how often the user encounters in content of requested pages.

Thirdly, frequent terms or keywords may need to be identified. For every keyword stored in the keyword log, the user modeling server periodically may calculate the keyword frequency value using the formula below, which may be a fraction of number of occurrences of keyword$_i$ for user$_j$ and the total number of occurrences of all keywords registered for user$_j$. The keyword frequency value may then be leveraged to identify interest degree. High keyword frequency may denote high degree of interest for the user.

$$TF_{i,j} = \frac{t_{i,j}}{\sum_k t_{k,j}}$$

Additionally, the user modeling server may perform reason leveraging a domain knowledge model represented as ontology. For instance, if the user model contains a user interest in Berlin and in the domain model Germany may be connected to Berlin through the property "hasCapital", then the server may propagate user interest from the former to the latter.

Browser history—A browser history may denote information that may be stored in the user browsing log and may be represented as a table containing IDs, e.g. URLs, of the portal resources accessed by the user. The resource IDs may be collected by the portal through monitoring the user activity on the portal pages and recording the IDs of all the resources that the user requests.

Interactive graphical user interface—An interactive graphical user interface may denote a system that allows a user to interact with a specific computer system in order to manage his/her interaction with a portal in a better way. It may include a screen, a pointing device like a computer mouse and a keyboard. The interface may also comprise a control system for managing the required input and output operations. A pointing device may be e.g., a computer mouse with a related arrow on a screen.

Semantic type—A semantic type may denote a group of terms or keywords that related to a common context. Examples may be "country", "people", "friends", "industry", or "companies". Semantic types are extracted by the user modelling server and stored as part of the user interest model.

Degree of interest—A degree of interest may denote an interest that a user has in a certain information topic. In this context, the degree of interest may denote the interest a user has in information topics when looking for information in a portal that is typically accessed by browser. The portal may give access to the Internet/Web or a closed network of information such as an intranet. In one model, three degrees of interest are differentiated: "interest", "partial interest" and "no interest".

Frequency of history—A frequency of history may denote to how often a keyword appears in the browser history of a user. The keyword may directly be part of a search topic for a search engine or it may be part of the information page a browser delivers back. It may also be the case that the keyword is only part of an attachment to a specific browser page.

Interaction component—An interaction component may be implemented in hardware or software or a combination of both. An interaction component may denote a component that allows an interaction between the interactive graphical user interface and a user. The interaction component may interpret commands from the user in the form of pointing device movement or pointing device clicks. The interactive component may also display results of an interaction with other components of the interactive graphical user interface as a result of an interaction.

The above-described method for interactive visualization of a user interest model via an interactive graphical user interface and the associated graphical interaction system may provide a couple of advantages. One of the advantages of this architecture is a much better man-machine interface. As discussed above, users may often not know what is stored in the user interest model representing the interest of a user regarding information in an intranet or the Internet. The method for interactive visualization of a user interest model allows a proactive interaction with the system and thus, interactivity between an automatically analyzed user behavior with machine-perceived interests stored in the user interest model, and real user interests that might be different to the perceived or analyzed interests of the system. The method for interactive visualization of a user interest model allows a user to actively influence the content of the user interest model graphically thus, allowing a more improved way of communicating with a computer system. In the end, the method finally represents an optimized user interface resulting in a better and faster finding of information, analyze contexts and information dependencies and become more productive.

In one embodiment, the interest represented by the keyword may relate to an interest group, wherein different interest groups represent a different degree of interest. In particular, the interest groups may be "interest", partial interest" and "no interest". These interest groups may be mapped to different rings. And the rings may be displayed in different colors. If specific keywords are, e.g., displayed in a red inner ring/circle, a user sees immediately that the displayed keyword represents an interest that the user sees as being of "interest", meaning that he is really interested in the topic expressed by the keyword. Additional, interest groups may be possible allowing a finer granularity of the represented degree of interests. However, the distance of a displayed keyword from the center of the ring allows a seamless or continuous adaption of interest degrees, also inside rings.

In another embodiment, different frequencies in a history of the keyword in the user interest model are indicated by differently sized letters of the keyword displayed. This means that those keywords found relatively often in the user browser history or in the documents related to the browser addresses compared to other keyword, are displayed with a larger font size on the interactive graphical user interface. In contrast, keywords showing a low frequency in the browser log file or browser history, and thus in the user interest model, are displayed in a smaller font size. It may also be useful not only to change the font size, but also the boldness degree of characters of the keyword, e.g., bold vs. non-bold, or the display colors of the keyword.

In again another embodiment, the method may further comprise selecting a grouping attribute for the semantic type, and displaying keywords belonging to the same semantic type in the same circular sector. This means that the keyword may be grouped into circular sectors by a e.g., type, a date last modified, and a date entered. The grouping by type allows users to place together terms that belong to the same class such as person, company, location, industry term, and country and so on. The groupings by date last modified and date entered, may allow clustering keywords using the date on which they were modified the last time and the date they were entered the first time into the user interest model. The date here may be an aggregated value such as this week, last week or this month, last month and so on. The actual values may be derived from the underlying user interest model and its capabilities. It should be understood that this coupling between the interactive graphical user interface may be adaptable and self organizing.

In one embodiment, the method may further comprise selecting a filtering parameter for the semantic type, wherein the displaying of keywords may comprise a displaying of keywords, which may fulfill the selected filtering parameter. This means that the method may comprise a number of filtering options. The user may filter keywords by their semantic type, e.g., display only companies, people, and countries. Also, the user may filter keywords by interest group, for instance, display only terms that she or he is interested in.

In yet another embodiment, the method may further comprise adding a new keyword to the user interest model. Such an addition of a new keyword may be implemented by a pop-up box for entering a new keyword. Dragging of the new keyword may immediately signal to the user interest model the degree of interest the user has in this new keyword. Without this option, a new keyword would normally be placed in the category "no interest" because there would be no history of the keyword in the user interest model. The interactive graphical user interface may then allow dragging the new keyword into the ring representing "interest". The dragging may be implemented by positioning a pointing device of the interactive graphical user interface over the corresponding new keyword, hold down a button of the pointing device and move the keyword to a different distance relative to the center of the ring thereby changing interactively the degree of interest stored in the user interest model. It may also be possible to move the new keyword into a different circular sector thereby signaling to the interactive graphical user interface and thus to the user interest model to associate the new keyword to a specific semantic type.

In a further embodiment, the method may further comprise blocking of a keyword in the user interest model. Such a blocking entry for a keyword may result in not displaying the respective keyword in the interactive graphical user interface. This may be applicable if a user regularly reads new from a news feed and the brand name of the news feed is displayed on every news page presented to a user. In this case, the brand name would have a high frequency in a history of the keyword or the associated documents, e.g., news feed Internet pages. However, the user is not interested in the company producing the news on the Internet, but only in its content. Blocking may be a way to eliminate those disturbing keywords.

Furthermore, in one embodiment, the method may further comprise displaying at least one content element of the interest represented by the keyword. Such a details-on-demand function may be implemented by hovering over a keyword with a pointing device interactive graphical user interface, enabling the user to see other keywords related to the keyword. E.g., by hovering over the keyword Germany, the methods may enable the interactive graphical user interface displaying connections to related keywords, such as Munich, Nurnberg, and Bavaria. Such connections may be displayed by dashed lines between the keywords. This may allow users finding out the keywords that potentially may be interesting and drag them closer to the center of the ring, letting the system know about updated user interests.

Also, the interactive graphical user interface may allow users to see some additional information about keywords. Clicking on a keyword may display an info box containing information like an explanation of the reasons why the keyword appears in the user model, e.g., a list of documents/home pages that the user has read about that keyword. Additionally, lists of documents the user has not seen yet but might be of interest to the user may be displayed in the info box because of their semantic relevance to the selected keyword.

In a further embodiment, the method may further comprise exporting the keyword together with attribute values. Attribute values may be, e.g., the degree of interest or a semantic type of the keyword. Such an exporting allows the interactively changed or edited user interest model to be used by other interface systems that may use a different technique for a visualization of user interest models.

In another embodiment, the method may further comprise determining and displaying a retro perspective view of the degree of interest in a definable time frame. This may allow a user accessing a certain keyword and the related degree of interest over time.

Furthermore, a computer system may comprise graphical interaction system, as just described with reference to the method for interactive visualization of a user interest model via an interactive graphical user interface.

It should be noted that embodiments may take the form of an entire hardware implementation, an entire software embodiment or an embodiment containing both, hardware and software elements. In a preferred embodiment, the invention is implemented in software which includes, but is not limited to, firmware, resident software and microcode.

In one embodiment, a data processing program for execution in a data processing system is provided comprising software code portions for performing the method, as described above when the program is run on a data processing system.

Furthermore, embodiments may take the form of a computer program product, accessible from a computer-usable or computer-readable medium providing program code for use, by or in connection, with a computer or any instruction execution system. For this purpose of this description, a computer-usable or computer-readable medium can be any apparatus that may contain, store, communicate, propagate, or transport the program for use, by or in a connection, with the instruction execution system, apparatus, or device.

The medium may be an electronic, magnetic, optical, electromagnetic, infrared or a semi-conductor system for a propagation medium. Examples of a computer-readable medium include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blue-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular between features of the method type claims, and features of the apparatus type claims, is considered as to be disclosed within this document.

The aspects defined above and further aspects of the present invention are apparent from the examples of embodiment to be described hereinafter and are explained with reference to the examples of embodiment, but to which the invention is not limited.

BRIEF DESCRIPTION OF THE DRAWINGS

Preferred embodiments of the invention will now be described, by way of example only, and with reference to the following drawings.

DETAILED DESCRIPTION OF EXEMPLARY EMBODIMENTS

Figure 1:
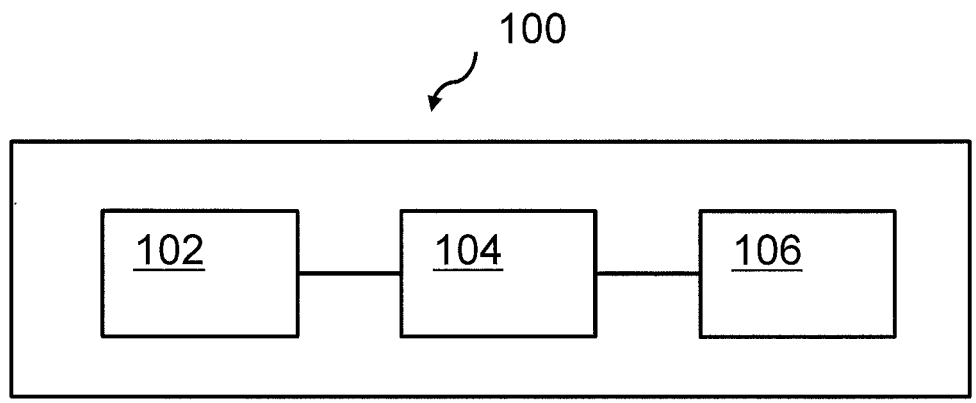
FIG. 1 shows a block diagram of the inventive method for interactive visualization of a user interest model via an interactive graphical user interface.

In the following, a detailed description of the drawings will be given. All illustrations in the drawings are schematic. Firstly, a block diagram of the inventive method for interactive visualization of a user interest model via an interactive graphical user interface will be described. Afterwards, embodiments of a method and appearances of embodiments of the method for interactive visualization of a user interest model via an interactive graphical user interface will be described.

FIG. 1 shows a block diagram of the inventive method 100 for interactive visualization of a user interest model via an interactive graphical user interface. The method 100 may comprise displaying, 102, at least one keyword 302, 304 in a circular sector 308 on a ring 310, 312, 314 on the interactive graphical user interface, wherein the keyword 302, 304 represents an interest of the user interest model, wherein a radial position of the keyword on the ring 310, 312, 314 represents a degree of interest stored as part of the user interest model, and wherein the circular sector 308 represents a semantic type of the user interest model, and changing, 104, the degree of interest via an interaction component of the interactive graphical user interface. FIG. 1 shows also the method step of selecting 106 a filtering parameter. However, the method steps may take another sequence as shown in FIG. 1.

Figure 2:
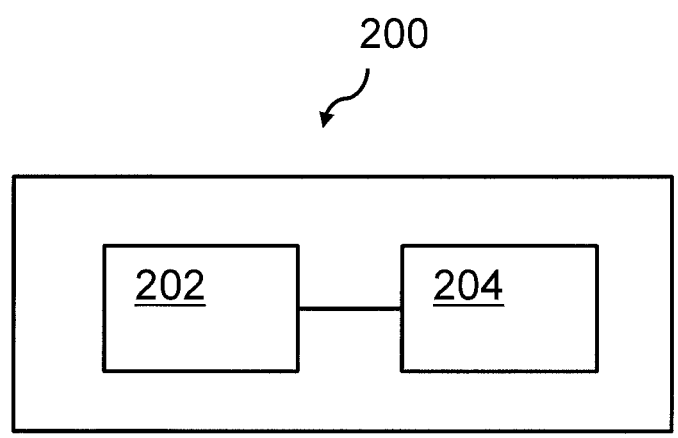
FIG. 2 shows a block diagram of a related graphical interaction system.

FIG. 2 shows a block diagram of a related graphical interaction system 200. The graphical interaction system 200 may comprise a displaying unit 202 adapted for displaying a keyword 302, 304 in a circular sector 308 on a ring 310, 312, 314 on a display of the graphical interaction system 200, wherein the keyword 302, 304 represents an interest of an user interest model, wherein a radial position of the keyword 302, 304 on the ring 310, 312, 314 represents a degree of interest stored in the user interest model, and wherein the circular sector 308 represents a semantic type of the user interest model, and a changing unit 204 adapted for changing the degree of interest via an interaction component of the interactive graphical interaction system.

Figure 3:
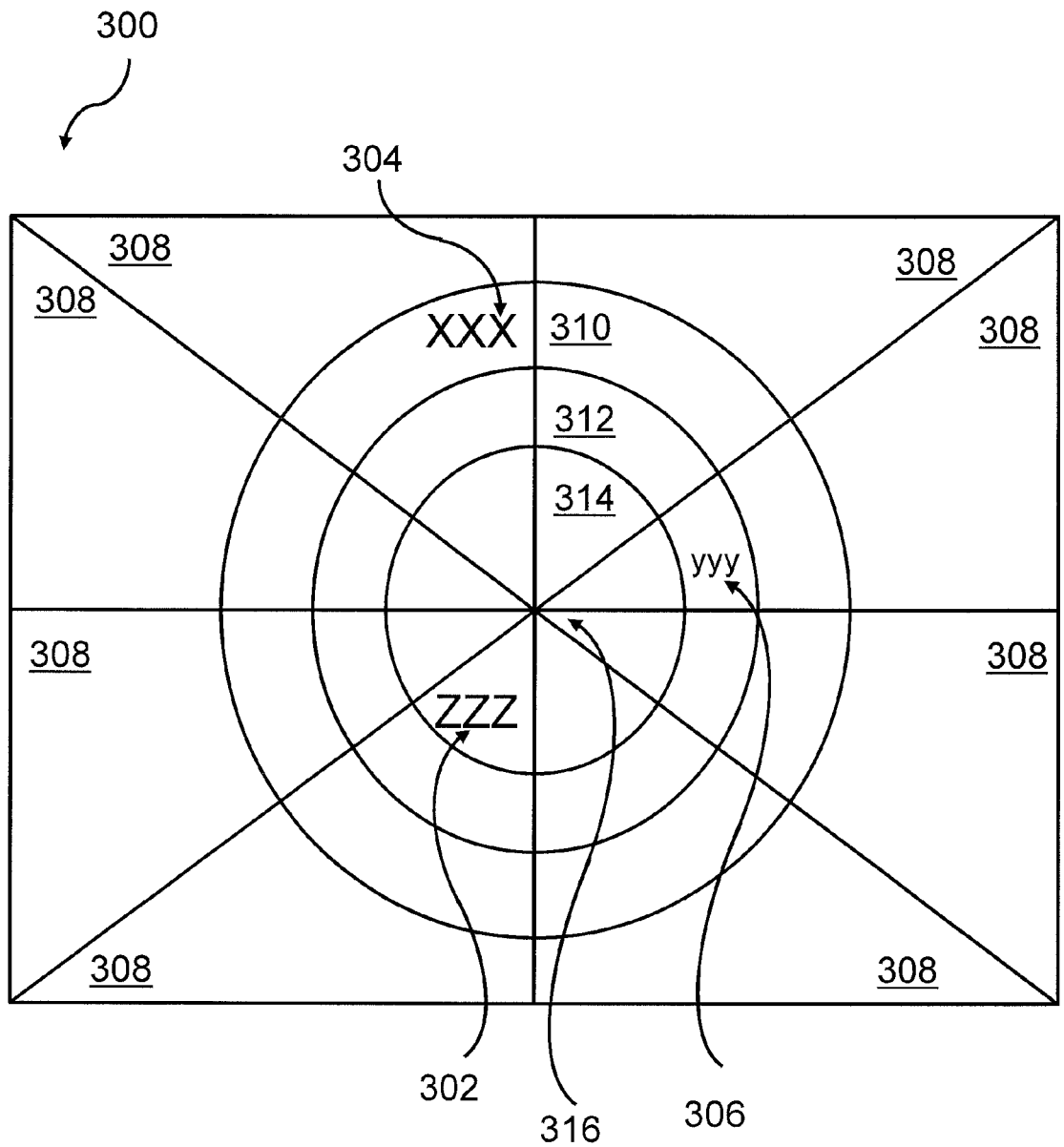
FIG. 3 shows an appearance of an embodiment of the inventive graphical interaction system.

FIG. 3 shows an appearance of an embodiment of the inventive graphical interaction system 300. The part shown of the inventive graphical interaction system 300 may be a part of a computer display 712, displaying concentric rings 310, 312, 314. They may represent different groups of interest. E.g., the inner ring 314 may show keywords 302 of "interest" to a user, the middle ring 312 may show keywords 306 being "partial interest" to a user and the outer ring 310 may be an area where keywords 304 of "no interest" to a user are displayed. The font size of a keyword 302, 304, 306 may be related to a frequency in a history of a browser. I.e., the larger the font size for a keyword is, the higher the frequency of access to documents containing that specific keyword. In the example, the keywords 302 and 304 may be keywords with a high frequency whereas the keyword 306 may have a smaller font size thereby representing a keyword with a lower frequency in documents that may have references in the browser history or a related user interest model. More rings are possible in order to have a higher differentiation option for degrees of interest. The rings 310, 312, 314 may be colored from red for the middle ring 314 to blue in the outer space of ring 310. It is not required to use three rings. Embodiments also work with just one circle implementing a hot/cold and interest/no interest model. Other color schemas may well be possible.

The smaller the radial distance of a keyword 302, 304, 306 is away from the center 316, the higher the user interest is in this keyword and related information.

By pointing on a keyword 302, 304, 306, keeping a button pressed on a pointing device (not shown) and moving the keyword 302, 304, 306 into a different region of the inventive graphical interaction system 300, the degree of interest of a user may be changed actively by a user. This way, a keyword that may be displayed at a low distance to the center of a ring 314 may be moved to the outer region 310 of the inventive graphical interaction system, thus signaling to the inventive graphical interaction system and the underlying user interest model that the user may not or to a lesser degree be interested in the information related to this keyword.

Figure 4:
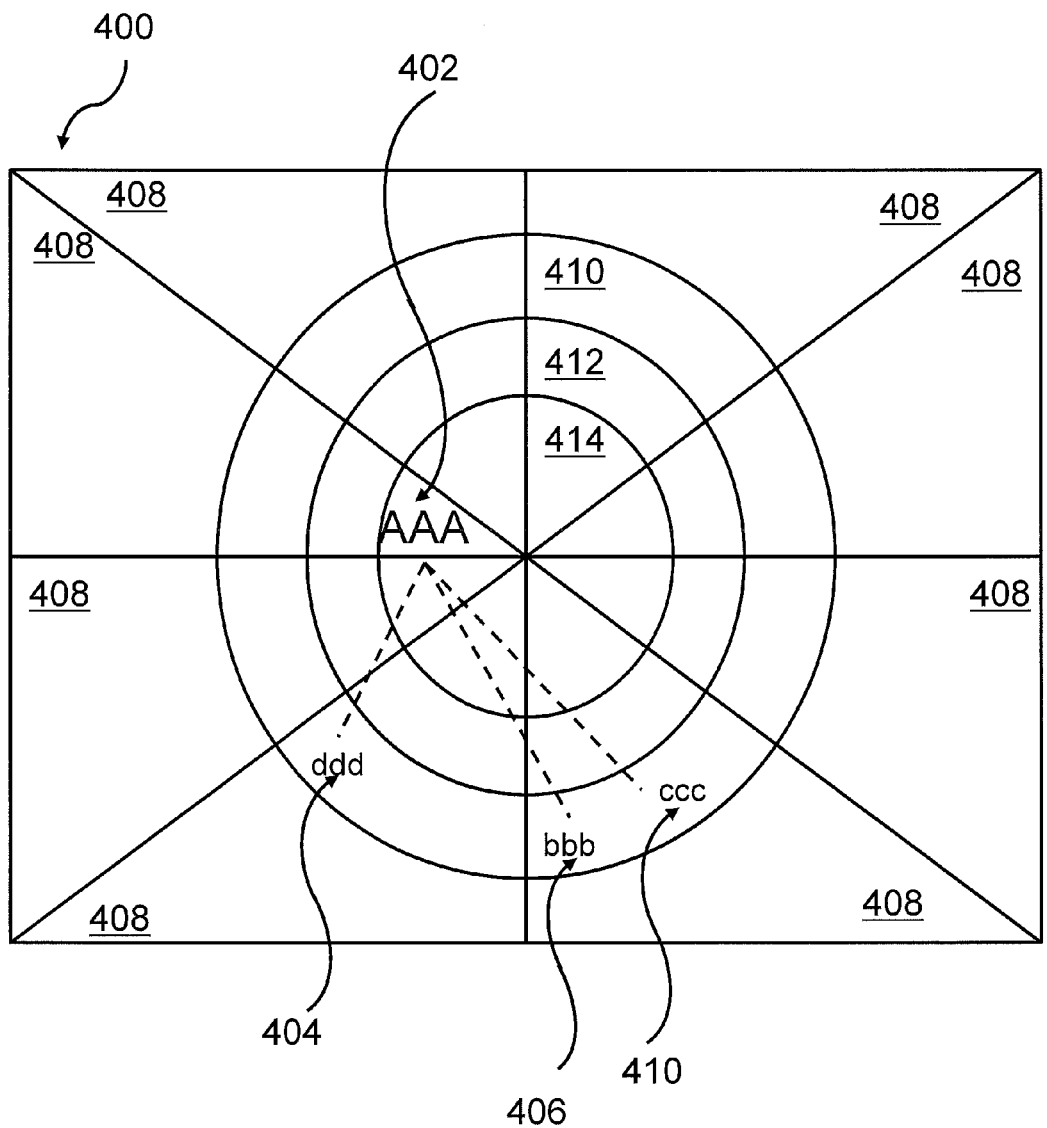
FIG. 4 shows another appearance of an embodiment of the inventive graphical interaction system.

FIG. 4 shows another appearance of an embodiment of the inventive graphical interaction system 400. In this embodiment relationship between keywords 402, 404, 406, 410 are shown. This function may be enabled by hovering over a keyword with a pointing device (not shown). For keywords that are semantically connected, a line, e.g., a dashed line may connect keywords 402, 404, 406, 410 that are logically linked in the user interest model. The user interest model is a data model reflecting interests and related information. FIG. 4 also shows the circular sector 408 as in FIG. 3.

Figure 5:
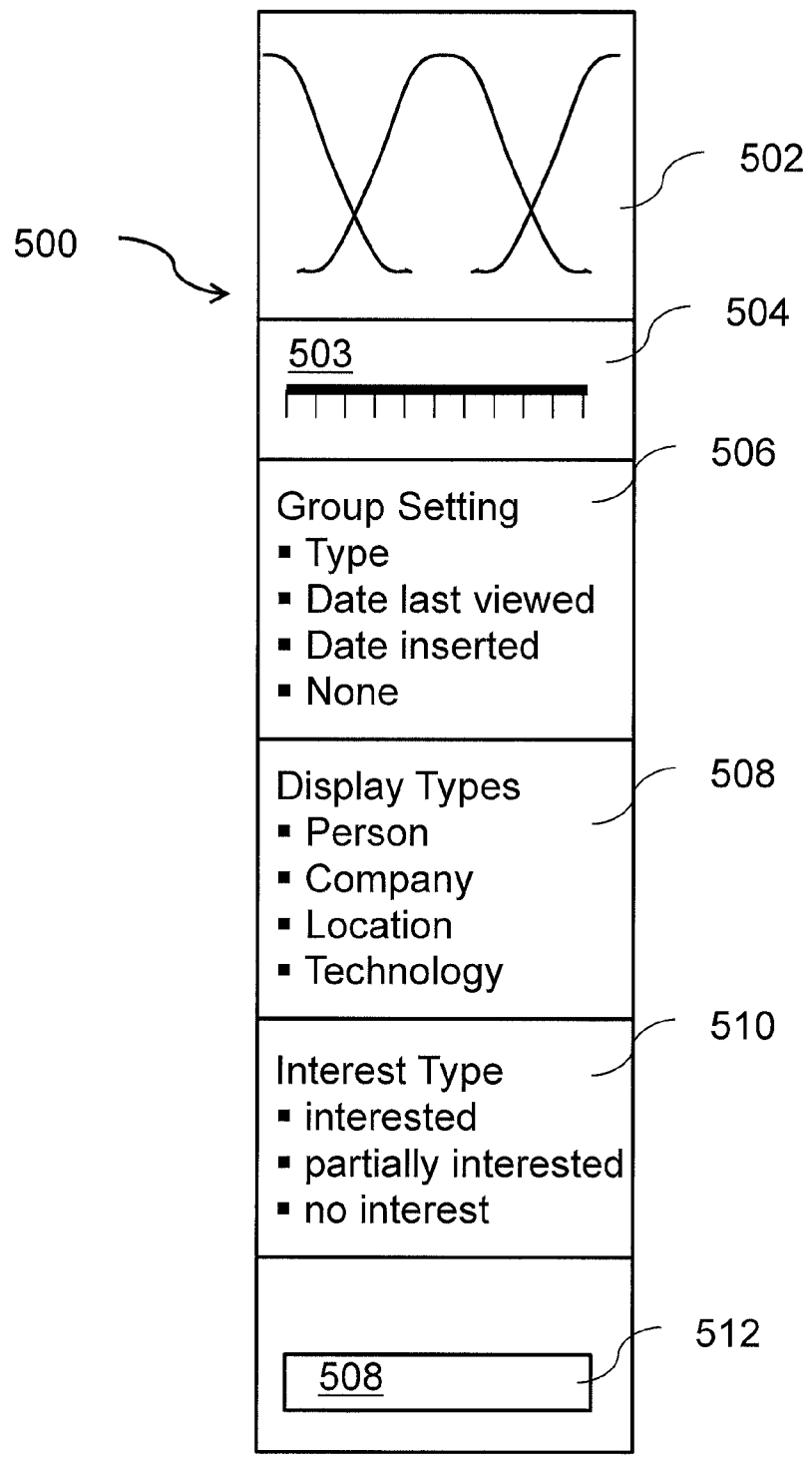
FIG. 5 shows a detail of an appearance of an embodiment of the inventive graphical interaction system.

FIG. 5 shows a detail of an appearance of an embodiment of the inventive graphical interaction system. In particular, a part of the graphical appearance of an interaction component is shown.

Reference numeral 502 shows a right half of a Gaussian curve, a complete Gaussian curve (cut at a certain low level) and a left half Gaussian curve. These curves may help the user interpret how the algorithm of the user modelling server calculates the radial position of a keyword. If a keyword may be selected, then the interactive graphical user interface may show a position of the keyword in an area of the Gaussian curves helping the user to interpret how the position of the keyword has been calculated.

The zoom scale 503 in the field 504 may let a user set a zoom factor. In the group setting field 506 the user may select or deselect certain group settings for influencing the displaying of keywords according to the selection. If a selection by date or "none" may be made, then field 508 might not be displayed at all. If in the group setting "type" is selected, then the user may also select one or more selection criteria from the check mark boxes indicated in field 508. If, e.g., "person" is selected by a check mark beside the word "person" then only keywords related to persons are displayed.

In field 510 an interest type may be selected. The selection options may be "interest", "partial interest" and "no interest". Only the keywords fulfilling the selection parameters may be displayed.

Finally, in field 512 a new keyword 508 that is not stored as part of the user interest model may be manually entered using a keyboard.

Figure 6:
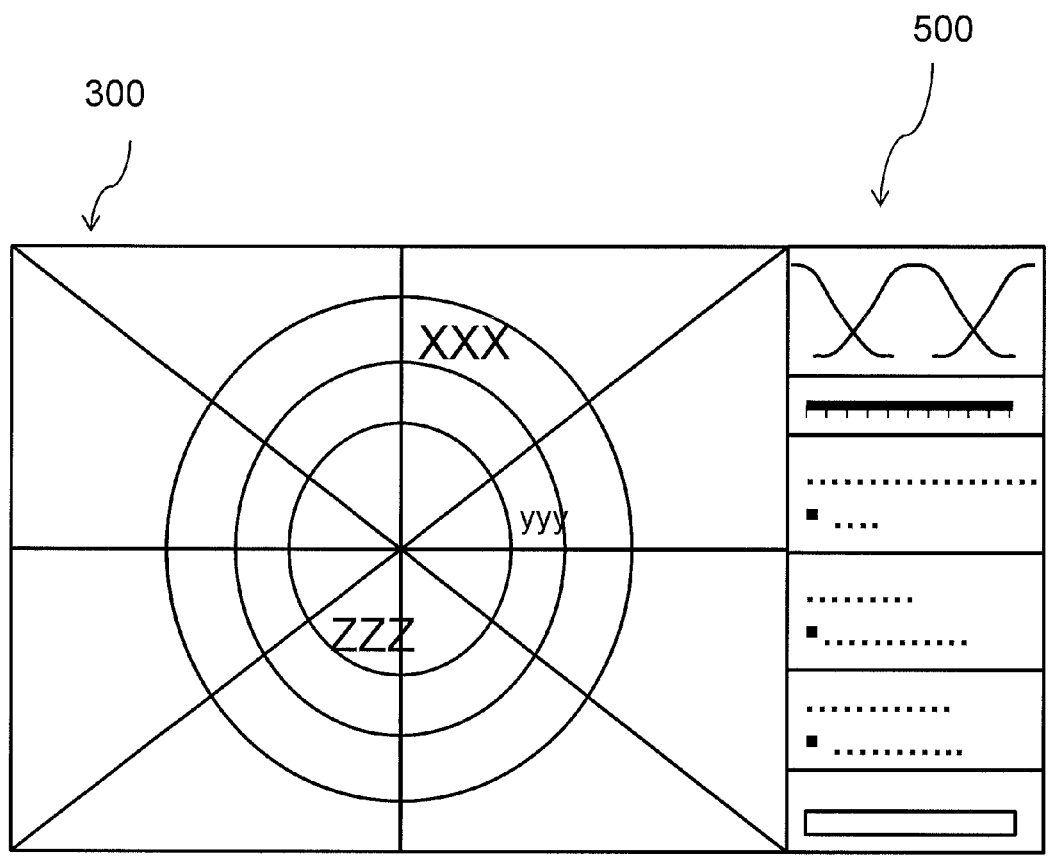
FIG. 6 shows a combined appearance of an embodiment of the inventive graphical interaction system.

FIG. 6 shows a combined appearance of an embodiment of the inventive graphical interaction system. The components of FIG. 3 or FIG. 4 and FIG. 5 have been combined. It may not be necessary positioning the graphical representation of the interaction component on the right side of the rings. It may as well be—user definable—on the left side. It may also be positioned in a top area of a screen or a button area of a computer screen. In such a case the boxes 502 to 512 may not be positioned one above the other, but side by side.

Figure 7:
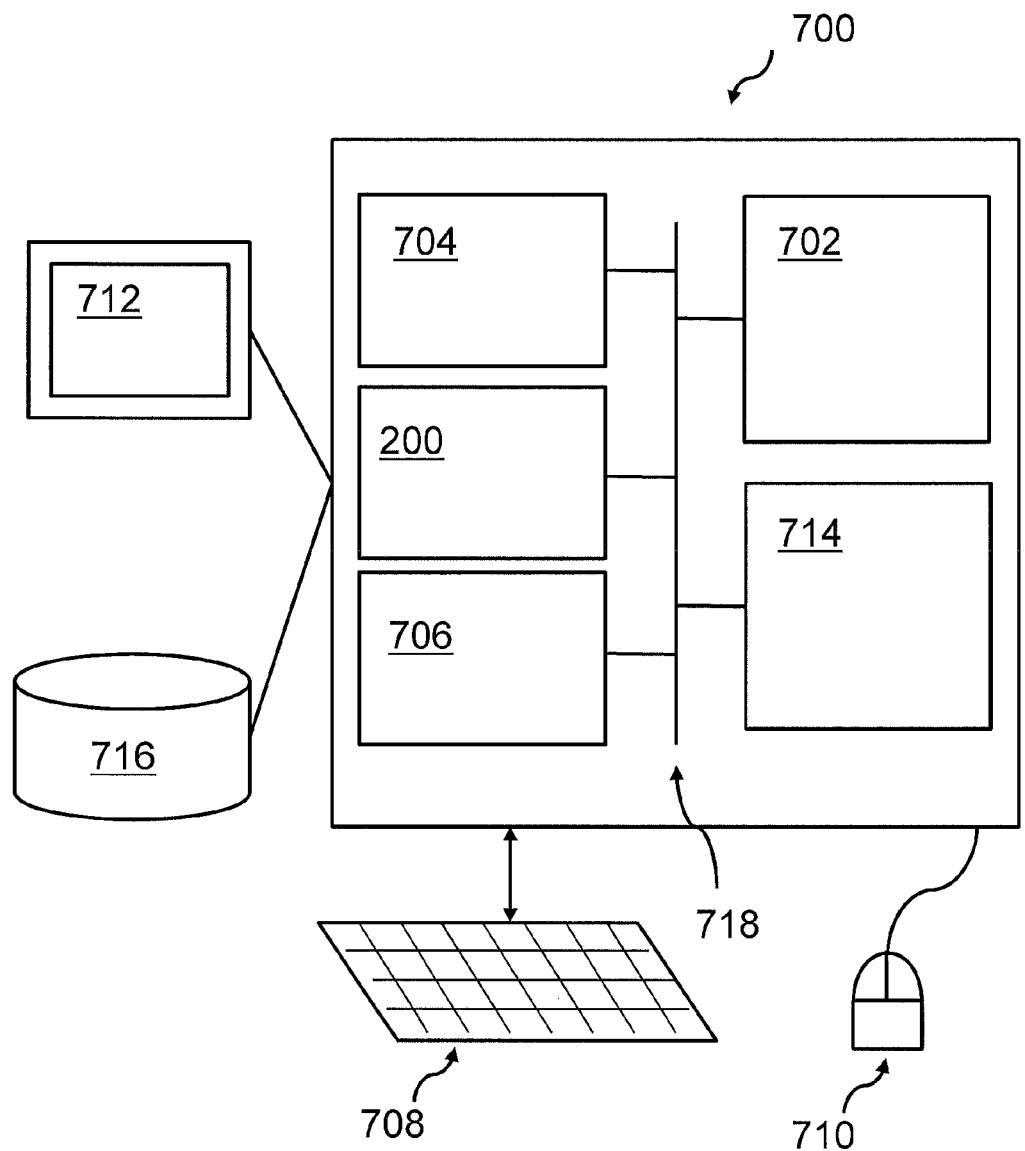
FIG. 7 shows a block diagram of a computer with components for executing a method for interactive visualization of a user interest model via an interactive graphical user interface.

Embodiments of the invention may be implemented on virtually any type of computer, regardless of the platform being used suitable, for storing and/or executing program code. For example, as shown in FIG. 7, a computer system 700 includes one or more processor(s) 702 with one or more cores per processor, associated memory elements 704, an internal storage device 706 (e.g., a hard disk, an optical drive such as a compact disk drive or digital video disk (DVD) drive, a flash memory stick, etc.), and numerous other elements and functionalities typical of today's computers (not shown). The memory elements 704 may include a main memory, employed during actual execution of the program code, and a cache memory, which provides temporary storage of at least some program code or data in order to reduce the number of times, code must be retrieved from external bulk storage 716 for an execution. Elements inside the computer 700 may be linked together by means of a bus system 718 with corresponding adapters.

The computer 700 may also include input means, such as a keyboard 708, a mouse 710 or a microphone (not shown). Furthermore, the computer 700, may include output means, such as a monitor 712 [e.g., a liquid crystal display (LCD), a plasma display, or cathode ray tube (CRT) monitor]. The monitor may be driven by the graphical interaction system 200. The computer system 700, may be connected to a network (e.g., a local area network (LAN), a wide area network (WAN), such as the Internet, or any other similar type of network including wireless networks via a network interface connection 714. This may allow a coupling to other computer systems. Those skilled in the art will appreciate that many different types of computer systems exist, and the aforementioned input and output means may take other forms. Generally speaking, the computer system 700 may include at least the minimal processing, input and/or output means, necessary to practice embodiments of the invention.

Further, those skilled in the art will appreciate that one or more elements of the aforementioned computer system 700 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources.

Further, software instructions to perform embodiments of the invention may be stored on a computer readable medium, such as a compact disk (CD), a diskette, a tape, or any other computer readable storage device.

While the invention has been described with respect to a limited number of embodiments, those skilled in the art, having benefit of this disclosure, will appreciate that other embodiments can be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. Also, elements described in association with different embodiments may be combined. It should also be noted that reference signs in the claims should not be construed as limiting elements.

The invention claimed is:

1. A method for interactive visualization and modification of a user interest model via an interactive graphical user interface, the method comprising:
displaying to a user through a computer monitor a representation of a user interest model of the user as automatically generated and stored by a modeling server, the representation having at least one keyword in a circular sector on a ring, wherein the keyword represents an interest of the user interest model, wherein a radial position of the keyword on the ring relative to center of the ring represents a degree of interest stored by the modeling server as part of the user interest model, and
wherein the circular sector represents a semantic type of the user interest model; and providing an interactive graphical user interface that enables the user to interact with the displayed representation of the user interest model including enabling the user to graphically modify the degree of interest via an interaction component of the interactive graphical user interface, wherein the interaction component displays to the user information about the keyword and how the modeling server calculated the radial position of the keyword, and the interaction component allowing the user to actively influence content of the user interest model graphically by the user changing keywords in the displayed representation and changing respective radial positions of keywords relative to the center of the ring in the displayed representation, to indicate an update of user interest.

2. The method according to claim 1 wherein the interest relates to an interest group, wherein different interest groups represent a different degree of interest.

3. The method as claimed in claim 1 wherein different frequencies in a history of the keyword in the user interest model are indicated by differently sized letters of the keyword displayed.

4. The method as claimed in claim 1 wherein the method further comprises:
selecting a grouping attribute for the semantic type, and
displaying keywords belonging to the same semantic type in the same circular sector.

5. The method as claimed in claim 1 wherein the method further comprises:
selecting a filtering parameter for the semantic type,
wherein the displaying of keywords comprises a displaying of keywords which fulfill the selected filtering parameter.

6. The method as claimed in claim 1 wherein the method further comprises dragging by a pointing device of the interactive graphical user interface the keyword inside the ring radially from one position to another position thereby changing the degree of interest.

7. The method as claimed in claim 1 wherein the method further comprises adding a new keyword to the user interest model.

8. The method as claimed in claim 1 wherein the method further comprises blocking of a keyword in the user interest model.

9. The method as claimed in claim 1 wherein the method further comprises displaying at least one content element of the interest represented by the keyword.

10. The method as claimed in claim 1 wherein the method further comprises exporting the keyword together with attribute values.

11. The method as claimed in claim 1 wherein the method further comprises determining and displaying a retro perspective view of the degree of interest in a definable time frame.

12. A computer graphical interaction system comprising:
a processor executing a displaying unit adapted for displaying on a computer monitor to a user a representation of a user interest model of the user as automatically generated by a server, the representation having a keyword in a circular sector on a ring, wherein the keyword represents an interest of the user interest model, wherein a radial position of the keyword on the ring relative to a center of the ring represents a degree of interest in the user interest model, and wherein the circular sector represents a semantic type of the user interest model; and
a computer memory storing a change unit executed by the processor and having an interactive graphical user interface enabling user interaction with the displayed representation of the user interest model, the change unit being adapted for modifying the degree of interest in response to user operation of an interaction component of the interactive graphical user interface, wherein the interaction component displays to the user information about the keyword and how the server calculated the radial position of the keyword, and the interaction component allowing the user to actively influence content of the user interest model graphically by the user changing keywords in the displayed representation and changing respective radial positions of keywords relative to the center of the ring in the displayed representation, to indicate an update of user interest.

13. A computer graphical interaction system as claimed in claim 12, further comprising:
a user modeling server storing the user interest model.

14. The computer graphical interaction system as claimed in claim 12 wherein the interest relates to an interest group, wherein different interest groups represent a different degree of interest.

15. The computer graphical interaction system as claimed in claim 12 wherein different frequencies in a history of the keyword in the user interest model are indicated by differently sized letters of the keyword displayed.

16. The computer graphical interaction system as claimed in claim 12 wherein keywords belonging to a same semantic type are displayed in the same circular sector.

17. The computer graphical interaction system as claimed in claim 12 wherein the graphical user interface enables the user to graphically modify the degree of interest by a pointing device dragging the keyword from inside the ring radially from one position to another position.

18. The computer graphical interaction system as claimed in claim 12 wherein the graphical user interface enables the user to add a new keyword to the user interest model.

19. A computer program product for interactive visualization and modification of a user interest model via an interactive graphical user interface, the computer program product comprising:
a computer readable storage medium having a computer readable program code embodied therewith, the computer readable program code when executed by a computer causes the computer to:
display to a user through a computer monitor a representation of a user interest model of the user as generated and stored by a modeling server, the representation having at least one keyword in a circular sector on a ring, wherein the keyword represents an interest of the user interest model, wherein a radial position of the keyword on the ring represents a degree of interest stored by the modeling server as part of the user interest model, and
wherein the circular sector represents a semantic type of the user interest model; and
provide an interactive graphical user interface that enables the user to interact with the displayed representation of the user interest model including enabling the user to graphically modify the degree of interest via an interaction component of the interactive graphical user interface, wherein the interaction component displays to the user information about the keyword and how the modeling server calculated the radial position of the keyword, and the interaction component allowing the user to actively influence content of the user interest model graphically by the user changing keywords in the displayed representation and changing respective radial positions of keywords relative to the center of the ring in the displayed representation, to indicate an update of user interest.

\* \* \* \* \*